(12) United States Patent
Al-Salqan

(10) Patent No.: US 6,549,626 B1
(45) Date of Patent: Apr. 15, 2003

(54) METHOD AND APPARATUS FOR ENCODING KEYS

(75) Inventor: Yahya Y Al-Salqan, Mountian View, CA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 08/955,015

(22) Filed: Oct. 20, 1997

(51) Int. Cl.$^7$ ................................................. H04L 9/00
(52) U.S. Cl. ....................................... 380/286; 380/277
(58) Field of Search ................................. 380/201–203, 380/228, 239, 241, 277, 278, 279, 281, 282–284, 285, 286; 713/170, 181

(56) References Cited

U.S. PATENT DOCUMENTS

| | | | |
|---|---|---|---|
| 5,237,610 A | * | 8/1993 | Gammie et al. ............... 380/10 |
| 5,557,765 A | | 9/1996 | Lipner et al. |
| 5,673,318 A | * | 9/1997 | Bellare et al. ................. 380/23 |
| 5,796,830 A | * | 8/1998 | Johnson et al. ............... 380/21 |
| 5,907,618 A | * | 5/1999 | Gennaro ...................... 380/286 |

OTHER PUBLICATIONS

Bruce Schneier, Applied Cryptography, second edition, 1996, pp. 30–31, 435–437.*
Menezes et al., "Handbook of Applied Cryptography", (1997) XP002177736 ISBN 0–8493–8523–7, pp. 389 & 394–395.
European Search Report, Oct. 15, 2001, Appl. No. EP 98–11–9629.

* cited by examiner

Primary Examiner—Gail Hayes
Assistant Examiner—Ho S. Song
(74) Attorney, Agent, or Firm—Beyer Weaver & Thomas LLP (57) ABSTRACT

A key such as a private key or key password of a private key is encrypted for storage, and may be decrypted if the private key becomes lost or unavailable. The key is encrypted by encoding, for example, by hashing, private information such as mother's maiden name and social security number, and the result is used as a key to encrypt the private key using DES or another symmetric encryption technique. The encrypted key is again encrypted, for example using asymmetric encryption, using the public key of a trusted party such as the certificate authority that generated the private key. The result may be stored as a key recovery file by the principal of the private key or another party. To decrypt the key recovery file, the private key corresponding to the public key used to encrypt the key recovery file is used to decrypt the key recovery file, for example by asymmetric decryption. The result is symmetrically decrypted using a key obtained by encoding, for example, by hashing, the private information in the same manner as was used to encrypt the key. The result of this decryption is the key.

29 Claims, 5 Drawing Sheets

METHOD AND APPARATUS FOR ENCODING KEYS

RELATED APPLICATIONS

The subject matter of this application is related to the subject matter of application Ser. No. 08/855,018 entitled, "Method and Apparatus for Recovering Encryption Session keys" filed on Jun. 30, 1997 by Yahya Y. Al-Salqan, and to application Ser. No. 08/954,170 entitled, "Method and Apparatus for Recovering Keys" filed concurrently with this application by Yahya Y. Al-Salqan, each application having the same assignee as this application and incorporated herein by reference in its entirety.

FIELD OF THE INVENTION

The present invention is related to cryptography and more specifically to the recovery of cryptographic keys.

BACKGROUND OF THE INVENTION

Encryption may be used to maintain the security of information. Information such as a message transmitted between a sender and a receiver may be encrypted to ensure that third parties do not have access to it. A computer file stored on a computer may also be encrypted to ensure that parties without authorization cannot obtain the information contained in the file, even if they have access to or possess the physical media on which the file is stored.

Two types of conventional encryption methods are used to secure information from misappropriation. Symmetric encryption methods use a key to encrypt information and use the same key to decrypt information. A message transmitted from sender to recipient may be symmetrically encrypted as long as the sender and the recipient have agreed upon the key. The Data Encryption Standard (DES) is an example of a symmetric encryption algorithm, and is described in Schneier, *Applied Cryptography*, (2d. ed., John Wiley & Sons, 1996).

Another form of encryption is known as asymmetric encryption. Asymmetric encryption encrypts information using one key known as a "public key", and decrypts the information using a different key known as a "private key". The private key is mathematically related to the public key, but extremely difficult to determine even if the public key is known. Asymmetric encryption allows a person to post his or her public key for anyone to use to encrypt information to be sent to the holder of the private key. Messages encrypted using the public key remain secure against anyone but the person or persons who hold the private key.

The pair of public and private keys are generated by a cryptographic module, and provided to an individual. The individual shares the public key with others he expects will send him or her encrypted messages known as cipher text, while maintaining the secrecy of his or her private key. In order to bind the public key and the identity of the individual owner of the public key and private key pair, referred to herein as the "principal", a trusted party known as a "certificate authority" issues a certificate which allows third parties to verify the identity of the principal.

Many users of encryption will select from symmetric and asymmetric encryption methods to suit their needs. For example, symmetric encryption may be used to encrypt and decrypt messages to be sent over unsecure communication facilities. However, if the symmetric encryption key (referred to as a "session key") must be sent over an unsecure facility, the key itself may be encrypted asymmetrically prior to transmission. The recipient decrypts the session key using his private key, and then uses the session key to decrypt the message. This technique allows the relatively more secure asymmetric encryption to be used to secure the session key, while the faster-to-use symmetric encryption is used to secure the message.

If a file is being secured, many users will use the most secure method available. Because asymmetric encryption can be more secure than symmetric encryption, many users will use asymmetric encryption to encrypt stored data they wish to secure.

To ensure security of the private key, only the principal has access to it. Because the private key may be a lengthy string of difficult-to-remember bytes or characters, the private key may be DES-encrypted using a key password, which can be easier for the principal to remember. The encrypted private key is then stored, for example by a decryption program, and is accessible only with the key password. To use the private key, the principal types the key password to the decryption program or other program which stores the encrypted private key. The key password is used to decrypt the private key, and the decrypted private key is used to decrypt the message, file or other information encrypted using the public key. In the event that the principal loses or forgets his private key or the key password, it is virtually impossible to decrypt messages encrypted using the recipient's public key. It is not uncommon for a principal to lose or forget his or her private key or private key password.

Another problem results if the principal works in an organization. If the principal is the only person who knows the private key, and the principal dies or leaves the employment of the company that owns the encrypted information, the company will not have access to the encrypted information.

To allow the recovery of a lost, forgotten or unavailable private key, some certificate authorities keep a copy of each private key in a vault or other form of key escrow. However, a breach of security would allow an intruder to steal the private key and decrypt any message sent to the principal. In addition, to ensure the highest levels of security, some principals may not wish to allow third parties such as certificate authorities to keep copies of their private key.

Therefore, there is a need for a method and system to encrypt a key or key password to allow the key or key password to be securely stored and to allow the encrypted key or key password to be recovered by the principal or his or her organization if the private key or key password is lost or otherwise unavailable to a person authorized to use it.

SUMMARY OF INVENTION

A system and method encrypts a principal's private key or key password for archival. Private information of the principal such as mother's maiden name and social security number is encoded, for example by hashing. The result of this encoding is used to symmetrically encrypt the private key or key password. The encrypted private key or key password is again encrypted, for example asymmetrically using the public key of a trusted party such as a certification authority as the encryption key. The result, known as a key recovery file, may be stored by the principal or other party trusted by the principal. If the principal's private key or key password is forgotten, lost or becomes unavailable to a party authorized to retrieve it, the stored key recovery file may be decrypted as described in copending application Ser. No. 08/954,170.

DETAILED DESCRIPTION OF A PREFERRED EMBODIMENT

Figure 1:
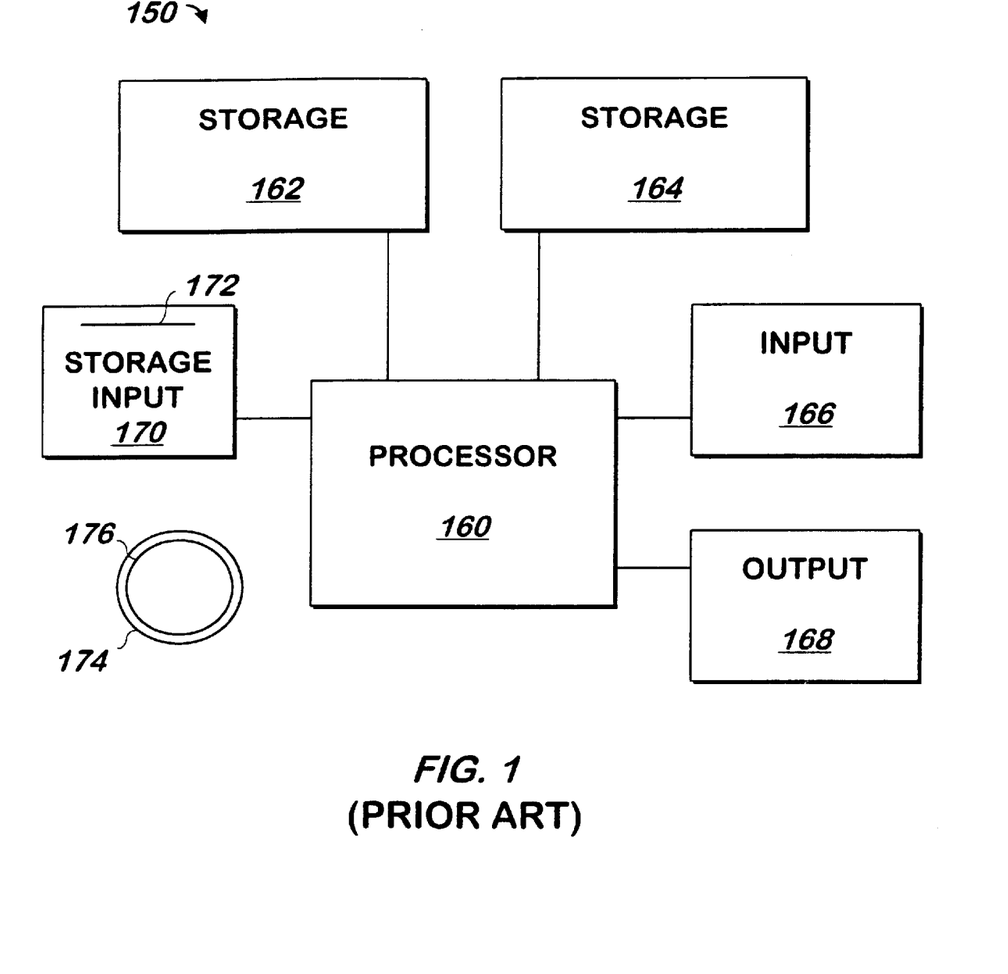
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive, CD-ROM drive or smart card interface accepts via input 172 computer program products 174 such as a conventional floppy disk, CD-ROM, smart card or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional Sun Microsystems Ultra 1 Creator computer running the Solaris 2.5.1 operating system commercially available from Sun Microsystems of Palo Alto, Calif., although other systems may be used.

Figure 2:
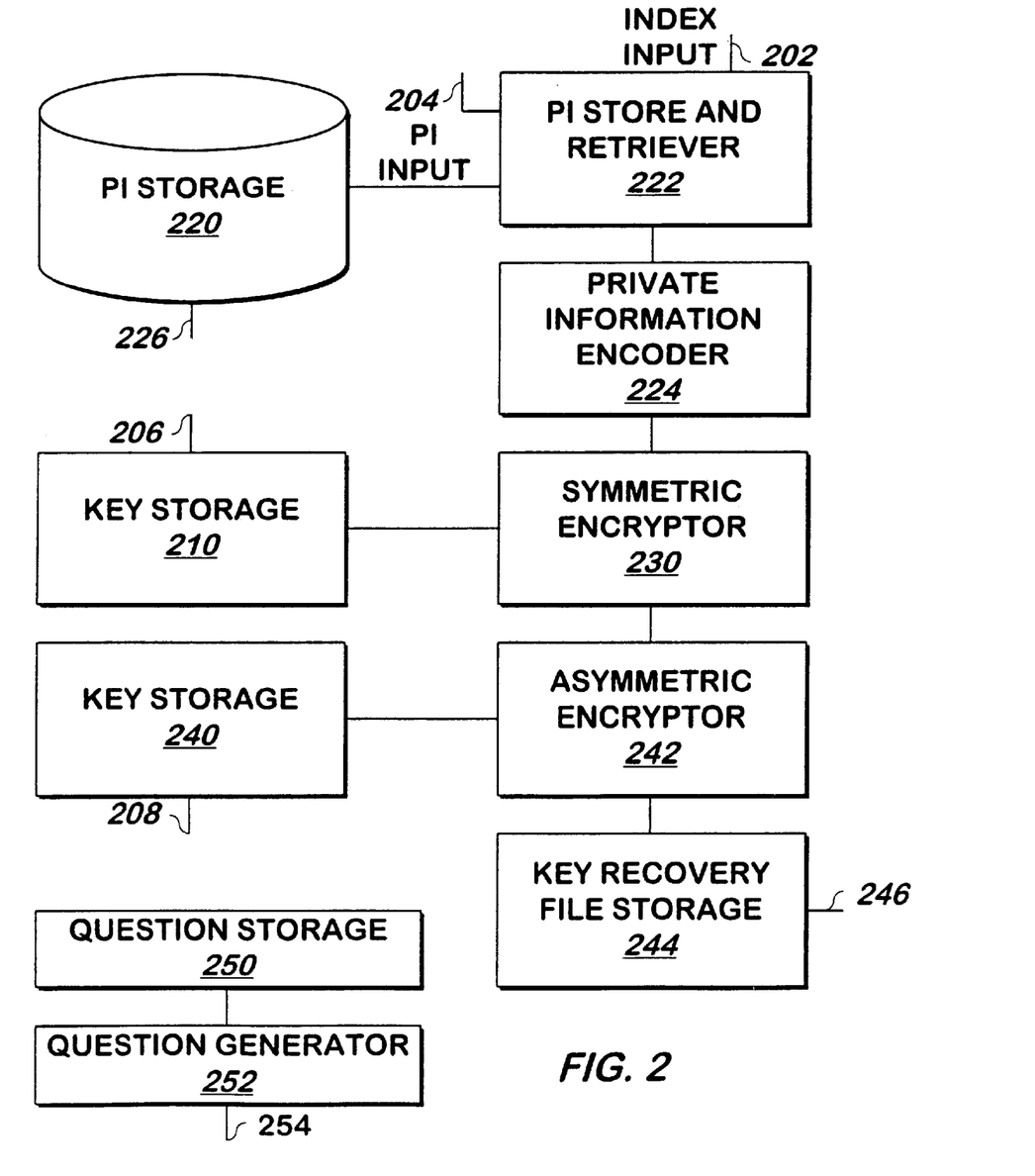
FIG. 2 is a block schematic diagram of a system for encrypting a key to produce a key recovery file according to one embodiment of the present invention.

Referring now to FIG. 2, a system for encrypting a key is shown according to one embodiment of the present invention. As used herein, a "key" can include a conventional session key or other key used for encryption and decryption of symmetrically encrypted information, a conventional private key used to decrypt asymmetrically encrypted information, a key password of a conventional key or private key, or any other information that is concealed from the public and used in any manner to decrypt an encrypted message or used to obtain such a key. In one embodiment, the key encrypted by the present invention is a key, although other information may be encrypted according to the present invention. The key to be encrypted is received at input 206 and stored in key storage 210. A key to be used to secure the key received at input 206, such as the public key of the certificate authority that issued the key received at input 206 is received at input 208 and stored in key storage 240. Private information storer and retriever 222 receives at input 204 private information. Private information is information that would likely be known only by the principal of the key received at input 206, such as social security number, mother's maiden name, and other similar information.

The principal or other party providing the private information may be prompted for the private information. Questions which prompt the private information may be retrieved from question storage 250 and provided by question generator 252 at output 254 coupled to a computer terminal or other device so that the questions may be provided to the principal, or other person attempting to recover the key from the key recovery file.

In one embodiment, the present invention stores the private information received for use as described below. Private information storer and retriever 222 receives at index input 202 an index used to store the private information received at input 204. In one embodiment, the index received at index input 202 is the public key of the individual providing the private information received at input 204. Private information storer and retriever 222 stores the private information in the private information storage 220 indexed by the index received at the index input 202. Private information storage 220 can provide the information indexed at output 226, for use as described below.

Private information storer and retriever 222 passes the private information received at private information input 204 to private information encoder 224. Private information encoder 224 encodes the private information it receives using any encoding function. In one embodiment, private information encoder 224 is a hasher, which hashes the private information it receives using a hash function. In one embodiment, the hasher is an SHA-1 hasher, which hashes the private information received using the conventional Secure Hash Algorithm, also referred to as the SHA-1 hash algorithm. In another embodiment, the hasher is an MD-5 hasher, which hashes the private information received using the conventional Message Digest 5 (MD-5) hash algorithm. The conventional Secure Hash Algorithm and MD-5 Algorithm are described in Schneier, *Applied Cryptography*, (2d. ed., John Wiley & Sons, 1996). Private information encoder 224 passes the result of the encoding to symmetric encryptor 230.

Symmetric encryptor 230 receives the encoded private information from private information encoder 224 and the key from key storage 210 and encrypts the key using a symmetric encryption function, with the result of the encoding function used as the encryption key to the symmetric encryption. In one embodiment, symmetric encryptor 230 is a conventional DES encryptor, which uses the conventional DES encryption or conventional triple DES encryption as the symmetric encryption function. The conventional DES encryption function and the conventional triple DES encryption function are each referred to herein as "DES encryption" or "DES Encrypting" and are described in Schneier, *Applied Cryptography*, (2d. ed., John Wiley & Sons, 1996). Symmetric encryptor 230 passes the encrypted key to asymmetric encryptor 242.

Asymmetric encryptor 242 encrypts the encrypted key received from symmetric encryptor 230 using an encryption method such as asymmetric encryption and the key received from and stored in key storage 240. Asymmetric encryption is described in Schneier, *Applied Cryptography*, (2d. ed., John Wiley & Sons, 1996). Asymmetric encryptor 242 passes the resulting encrypted key, referred to as a key recovery file, to key recovery file storage 244. Key recovery file storage provides at output 246 the key recovery file, which may be stored by the principal or others to retrieve the key encrypted therein. The key recovery file may then be deleted from key recovery file storage 244 so that only the principal or others authorized by the principal or other person receiving the key recovery file has the key recovery file.

In one embodiment, a user may not only assign a key password to a private key, but also occasionally update a key password. In one embodiment, a new key recovery file is produced as described herein using the present invention when the key password is assigned or updated.

Figure 3:
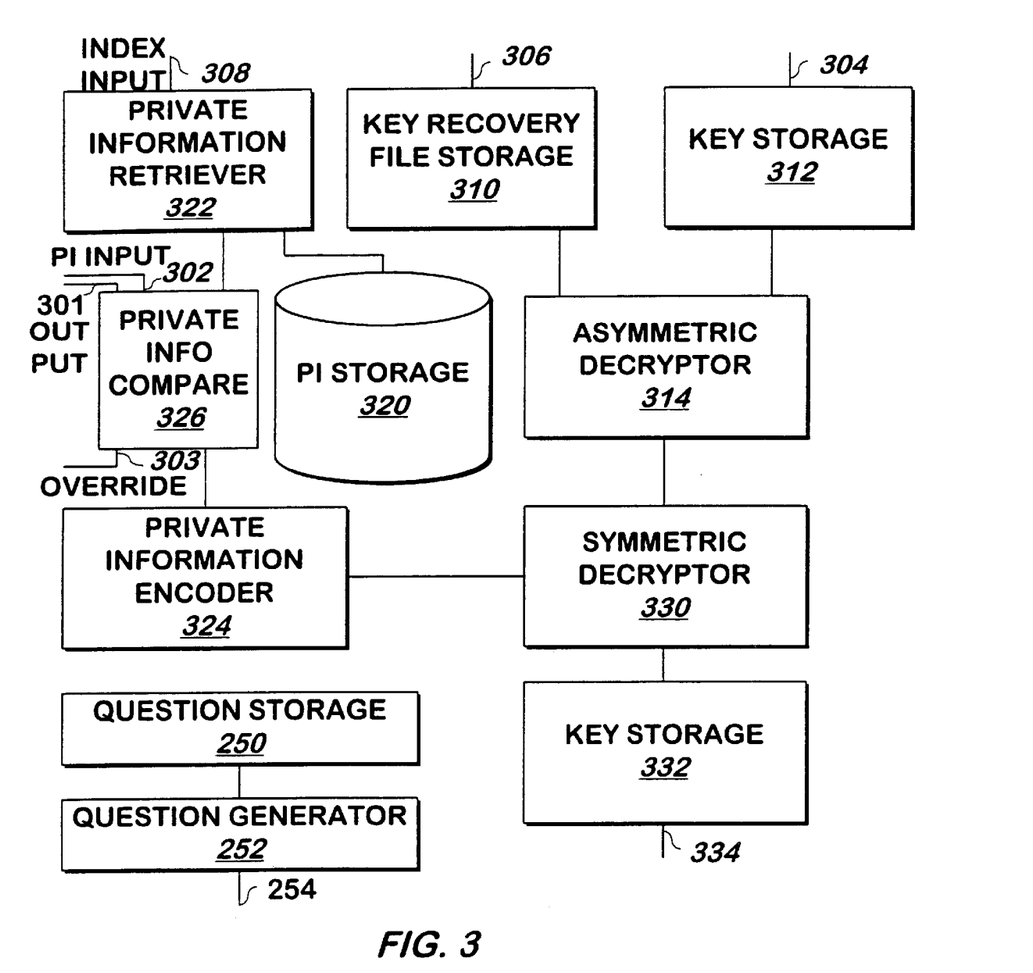
FIG. 3 is a block schematic diagram of a system for decrypting a key recovery file to produce a key according to one embodiment of the present invention.

Referring now to FIG. 3, a system for decrypting a key recovery file to produce a key is shown according to one embodiment of the present invention. The key recovery file is received at input 306 and stored in key recovery file storage 310. A key that will decrypt the encryption performed by the asymmetric encryptor 242 of FIG. 2 is supplied at input 304 and stored in key storage 312. If the key used to encrypt the key recovery file was the certificate authority's public key, the key received at input 304 is the certificate authority's private key.

Asymmetric decryptor 314 receives the key recovery file from key recovery file storage 310 and receives the certificate authority's private key from key storage 312. Asymmetric decryptor 314 decrypts the key recovery file using the certificate authority's private key stored in key storage 312 as the key. In one embodiment, the decryption asymmetric decryptor performs is conventional asymmetric decryption. Conventional asymmetric decryption is described in Schneier, *Applied Cryptography*, (2d. ed., John Wiley & Sons, 1996). Asymmetric decryptor 314 passes the decrypted key recovery file to symmetric decryptor 330.

In one embodiment, the principal may be prompted for the private information. Questions which prompt the private information may be retrieved from question storage 250 and provided by question generator 252 at output 254 coupled to a computer terminal or other device so that the questions may be provided to the principal, or other person attempting to recover the key from the key recovery file. Private information corresponding to these questions is received at input 302 by private information compare 326.

In one embodiment, the private information stored in private information storage 320 may be retrieved. In one embodiment, private information is, or contains information copied from or similar to, private information storage 220 of FIG. 2. In such embodiment, private information storage 320 is managed by a trusted party, such as the certificate authority. An index, such as the principal's public key, is received at input 308 and used by private information retriever 322 as an index into private information storage 320. Private information retriever 322 retrieves the private information stored in private information storage 320 and provides the private information to private information compare 326.

Private information compare 326 compares the private information received at input 302 with the private information received from private information retriever 322. If the private information received at input 302 matches or nearly matches the private information received from private information retriever 322, private information compare 326 passes the private information received at input 302 or the private information received from private information retriever 322 to private information encoder 324. If no such match is made, in one embodiment, private information compare 326 does not pass any private information to private information encoder 324, and in another embodiment, private information compare 326 passes the private information received at input 302 to private information encoder 324.

The private information may not be available from the principal, for example if the principal leaves the employment of an organization that continues to receive messages encrypted using the former employee's public key, or the organization wishes to decode information stored by the former employee and encrypted using a key known to the former employee and encrypted in a key recovery file as described above. In such embodiment, the user of the system shown in FIG. 3 can verify the identity of the person requesting the recovery of the key and signal via input 303, coupled to a conventional input device, such as a keyboard or mouse, that the comparison performed by private information compare 326 is to be overridden. Private information compare 326 then passes the private information received from private information retriever 322 to private information encoder 324.

In one embodiment, private information storage 320, private information retriever 322 and private information compare 326 are not used. Private information input 302 is coupled to the private information encoder 324, which encodes as described below whatever private information it receives via private information input 302.

Private information encoder 324 encodes the private information using the same procedure as private information encoder 224 of FIG. 2. In one embodiment private information encoder 324 encodes the private information into a fixed length result, for example using a hash function such as SHA-1 or MD-5 as described above. Private information encoder 324 provides the encoded private information to symmetric decryptor 330.

Symmetric decryptor 330 decrypts the key recovery file decrypted by symmetric decryptor 314 using the encoded private information received from private information encoder 324 as the decryption key. In one embodiment, symmetric decryptor employs a conventional symmetric decryption algorithm, such as the conventional DES algorithm or conventional triple DES algorithm to perform the decryption. As used herein, "DES decrypting" means decrypting using conventional DES decryption or triple DES decryption. In one embodiment, the decryption algorithm used by symmetric decryptor 330 is the decryption algorithm that corresponds to the encryption algorithm employed by symmetric encryptor 230 of FIG. 2. Symmetric decryptor passes the result to key storage 332. This result is the private key. The private key is then provided at output 334.

Figure 4:
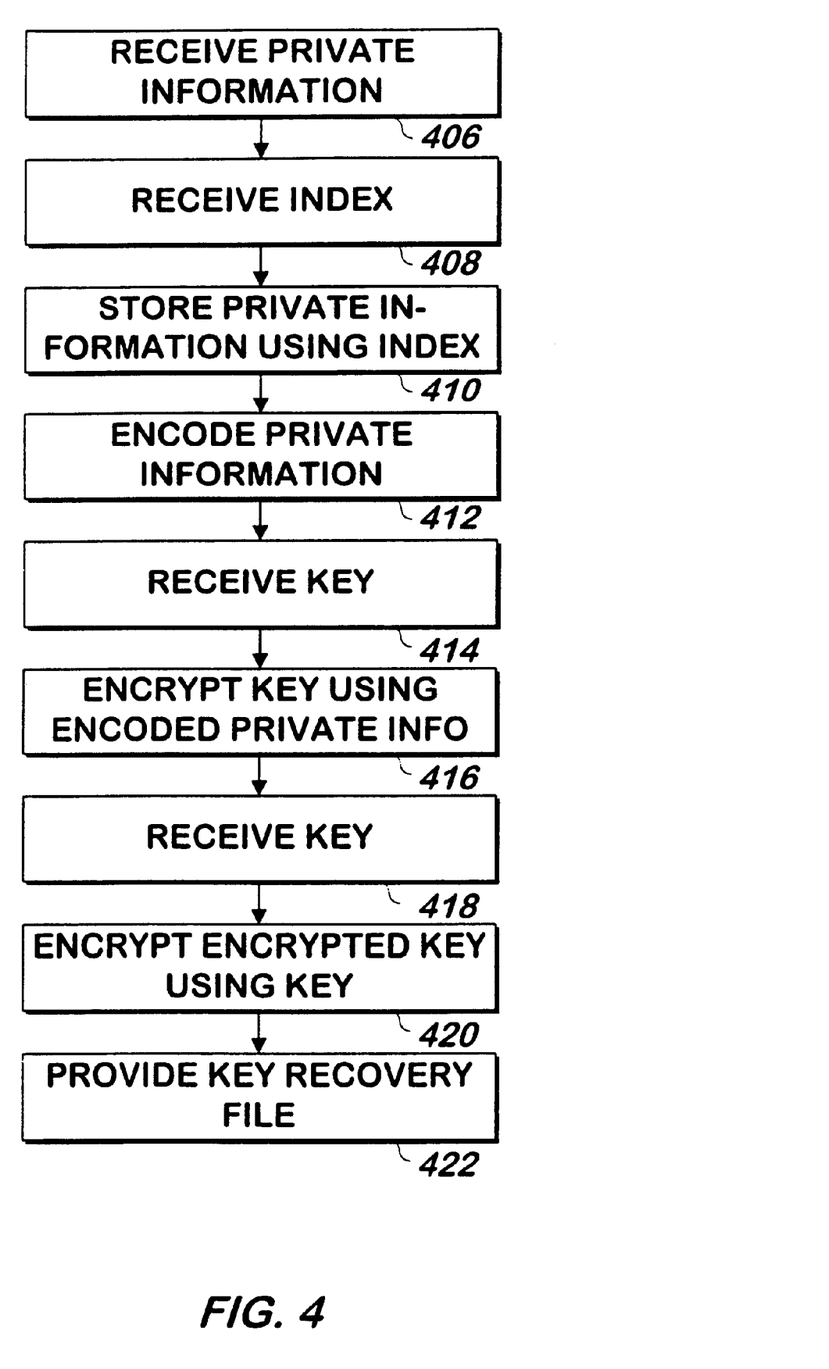
FIG. 4 is a flowchart illustrating a method of encrypting a key to produce a key recovery file according to one embodiment of the present invention.

Referring now to FIG. 4, a method of encrypting a key to produce a key recovery file is shown according to one embodiment of the present invention. Private information is received as described above 406. In one embodiment, an index is received 408, and the private information is stored 410 indexed by the index received. In one such embodiment, the index is the public key corresponding to the private key being encrypted.

The private information is encoded 412 as described above, for example using a hashing algorithm such as the secure hash algorithm SHA-1 or MD-5. The key to be encrypted is received 414. The key is encrypted 416, for example by using a symmetric encryption algorithm, such as DES encryption, with the private information encoded in step 412 as the encryption key.

A key, such as a public key of a trusted party such as the certificate authority that generated the key received in step 414 is received 418. The encrypted key produced in step 416 is encrypted 420, for example by using an asymmetric encryption function, with the key received in step 418 as the key to the encryption function. The result of step 420 is the key recovery file. The key recovery file is then provided 422 to the owner of the key or another party for safekeeping, and may be deleted by the party that produced the key recovery file.

Figure 5:
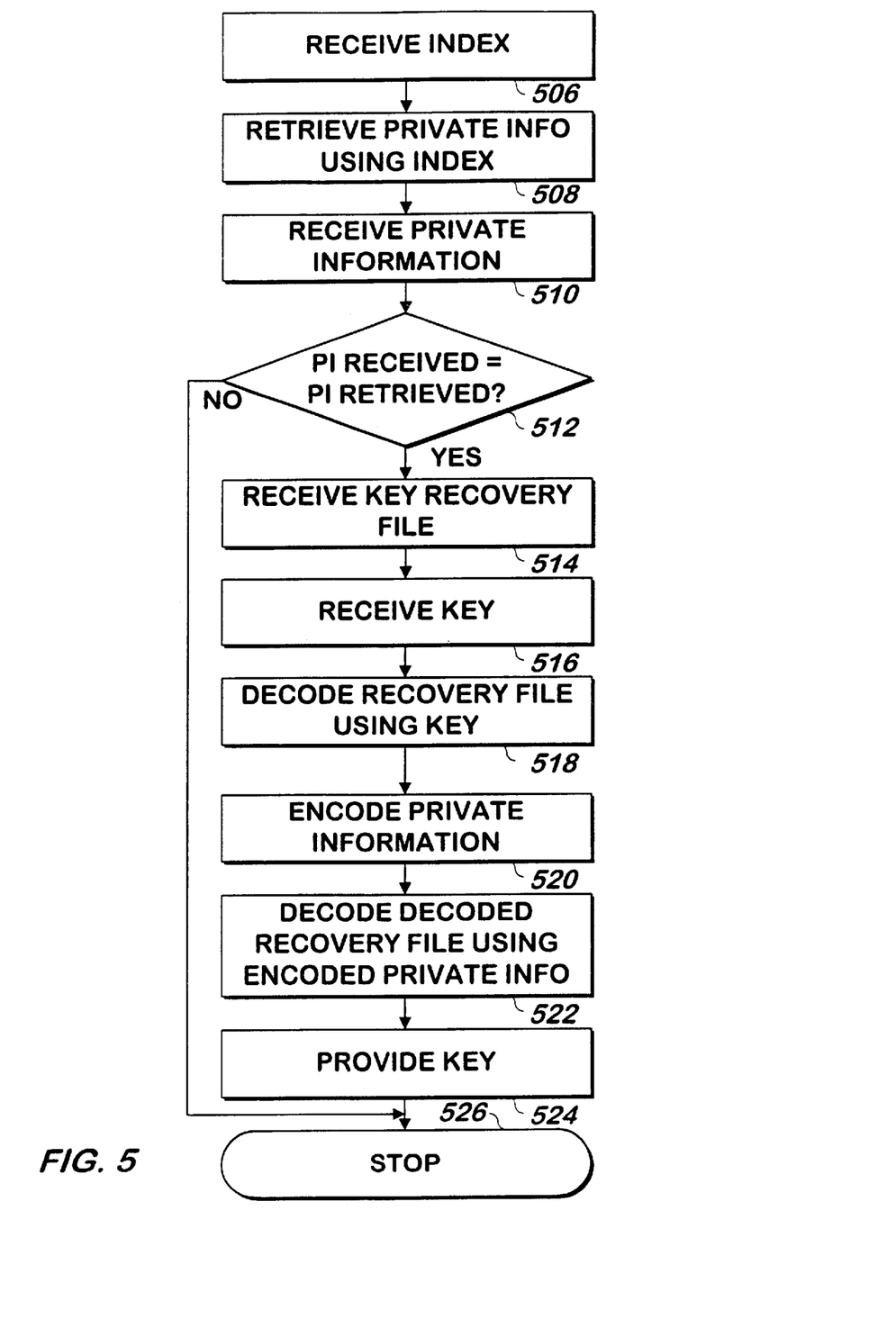
FIG. 5 is a flowchart illustrating a method of decrypting a key recovery file to produce a key according to one embodiment of the present invention.

Referring now to FIG. 5, a method of decrypting a key recovery file is shown according to one embodiment of the present invention. In one embodiment, the private information is stored as described above. An index may be used to retrieve the private information from storage. In such embodiment, the index is received 506 and the private information is retrieved 508 using the index received in step 508 as described above. In one embodiment, the index is the public key of the principal whose key is to be decrypted.

If the principal or other party is available to provide his or her private information, the private information is received 510, and compared 512 with the private information stored. If the private information received in step 510 is not equal to the private information retrieved from storage in step 508, the method terminates 526 in one embodiment.

If the principal is not available to provide his private information, steps 510 and 512 may be omitted, or replaced with other verification procedures to verify that the party requesting the recovery of the key recovery file is authorized to receive the key encoded in the key recovery file. Such verification may include receiving a sworn statement from an officer of a company, and comparing the name of the company with the name of the company listed on a certificate for the private key and public key pair. The key recovery file is also received 514.

A key corresponding to the key used to encode the key recovery file in step 420 of FIG. 4, such as a private key of the trusted party who provided their public key to encrypt the key recovery file, is also received 516. The key received in step 516 is used to decode 518 the key recovery file, such as by using conventional asymmetric decryption techniques. The private information received at step 512 is encoded 520, for example by hashing it using a hash function such as the SHA-1 or MD-5 hash function. The private information encoded at step 520 is used as a decryption key to symmetrically decode 522 the key recovery file decoded in step 518. The result is the key, which may be provided 524 to the party desiring the key.

What is claimed is:

1. A system for encrypting a first key, comprising:

a private information encoder having an encoder input operatively coupled to receive private information, the private information encoder for encoding the private information received at the encoder input to produce encoded private information at an encoder output;

a first encryptor having
 a first input coupled to the private information encoder output to receive the encoded private information and
 a second input operatively coupled to receive the first key,
 the first encryptor for encrypting the first key responsive to the encoded private information to produce a once encrypted first key at a first encryptor output; and a second encryptor having
 a first input coupled to the first encryptor output for receiving the once encrypted first key and
 a second input operatively coupled to receive a second key,
 the second encryptor for encrypting the once encrypted first key responsive to the second key to produce a key recovery file comprising a twice encrypted first key, and for providing the key recovery file at a second encryptor output coupled to a system output;

wherein the private information is generally known only to a first party;

further wherein the twice encrypted first key can only be decrypted by a second party to yield the once encrypted first key; and further wherein the party and the second party are different parties.

2. The system of claim 1, additionally comprising a private information storage having a first input coupled to the private information encoder input to receive at least a portion of the private information, the private information storage for storing at least a portion of the private information.

3. The system of claim 2 wherein:
the private information storage additionally has a second input operatively coupled for receiving an index; and
the private information storage stores at least the portion of the private information responsive to the index received at the private information storage second input.

4. The system of claim 3 wherein:
the first key is one selected from a key password of a private key and a private key; and
the index is a public key related to the private key.

5. The system of claim 1, wherein:
the private information encoder comprises a hasher having an input coupled to the private information encoder input and an output coupled to the private information encoder output, the hasher for hashing the private information received at the hasher input to produce a hashed private information and for providing at the hasher output the hashed private information; and
the encoded private information comprises the hashed private information.

6. The system of claim 5, wherein:
the hasher comprises and SHA-1 hasher having an input coupled to the hasher input for receiving at least a portion of the private information, the SHA-1 hasher for SHA-1-hashing the private information received at the SHA-1 hasher input to produce SHA-1-hashed private information, and for providing at an output coupled to the hasher output the SHA-1-hashed private information; and
the encoded private information comprises the SHA-1-hashed private information.

7. The system of claim 5, wherein:
the hasher comprises an MD-5 hasher having an input coupled to the hasher input for receiving at least a portion of the private information, the MD-5 hasher for MD-5-hashing the private information received at the MD-5 hasher input to produce MD-5-hashed private information, and for providing at an output coupled to the hasher output the MD-5-hashed private information; and
the encoded private information comprises the MD-5-hashed private information.

8. The system of claim 1 wherein:
the first encryptor comprises a DES encryptor having a first input coupled to the first encryptor first input for receiving the encoded private information, a second input coupled to the first encryptor second input for receiving the first key, the DES encryptor for DES encrypting the first key received at the DES encryptor second input responsive to the encoded private information received at the DES encryptor first input to produce a DES-encrypted first key, and for providing at an output coupled to the first encryptor output the DES-encrypted first key; and
the encrypted first key comprises the DES-encrypted first key.

9. The system of claim 1 wherein the second key received at the second encryptor second input is a public key.

10. The system of claim 9 wherein:
the first key is a private key related to a certificate authority; and
the second key is a public key of the certificate authority.

11. The system of claim 10 wherein the second encryptor encrypts the encrypted private key using asymmetric encryption.

12. A method of encrypting a first key, comprising:
receiving private information;
encoding the private information received;
receiving the first key;
encrypting the first key responsive to the encoded private information;
receiving a second key; and
encrypting the once encrypted first key responsive to the second key to generate a key recovery file comprising a twice encrypted first key;
wherein the private information is generally known only to a first party;
further wherein the twice encrypted first key can only be decrypted by a second party to yield the once encrypted first key; and
further wherein the first party and the second party are different parties.

13. The method of claim 12 comprising the additional step of storing the private information received.

14. The method of claim 13 wherein:
the first key comprises one selected from a key password of a private key and a private key; and
the storing step comprises storing the private information indexed using a public key related to the private key.

15. The method of claim 12 wherein the encoding step comprises hashing the private information received responsive to a hash function.

16. The method of claim 15 wherein the hash function is one selected from SHA-1 and MD-5.

17. The method of claim 12 wherein the encrypting the first key step comprises DES encrypting the first key, using the private information encoded as an encryption key.

18. The method of claim 12 wherein encrypting the encrypted first key comprises asymmetrically encrypting the encrypted first key using the second key received as an encryption key.

19. The method of claim 12 wherein the second key is a public key.

20. The method of claim 19 wherein the first key is generated by a certificate authority, and the second key comprises a certificate authority public key.

21. A computer program product comprising a computer useable medium having computer readable program code embodied therein for encrypting a first key, the computer program product comprising:
computer readable program code devices configured to cause a computer to receive private information;
computer readable program code devices configured to cause a computer to encode the private information;
computer readable program code devices configured to cause a computer to receive the first key;
computer readable program code devices configured to cause a computer to encrypt the first key responsive to the encoded private information;
computer readable program code devices configured to cause a computer to receive a second key; and
computer readable program code devices configured to cause a computer to encrypt the encrypted first key responsive to the second key to generate a key recovery file comprising a twice encrypted first key;
wherein the private information is generally known only to a first party;
further wherein the twice encrypted first key can only be decrypted by a second party to yield the once encrypted first key; and
further wherein the first party and the second party are different parties.

22. The computer program product of claim 21 additionally comprising computer readable program code devices configured to cause a computer to store the private information received.

23. The computer program product of claim 22 wherein:
the first key comprises one selected from a key password of a private key and a private key; and
the computer readable program code devices configured to cause a computer to store comprise computer readable program code devices configured to cause a computer to store the private information indexed using a public key related to the private key.

24. The computer program product of claim 21 wherein the computer readable program code devices configured to cause a computer to encode comprise computer readable program code devices configured to cause a computer to hash the private information received responsive to a hash function.

25. The computer program product of claim 24 wherein the hash function is one selected from SHA-1 and MD-5.

26. The computer program product of claim 21 wherein the computer readable program code devices configured to cause a computer to encrypt the first key comprise computer readable program code devices configured to cause a computer to DES encrypt the first key, using the private information encoded as an encryption key.

27. The computer program product of claim 21 wherein the computer readable program code devices configured to cause a computer to encrypt the encrypted first key comprise computer readable program code devices configured to cause a computer to asymmetrically encrypt the encrypted first key using the second key received as an encryption key.

28. The computer program product of claim 21 wherein the second key is a public key.

29. The computer program product of claim 28 wherein the first key is generated by a certificate authority, and the second key comprises a certificate authority public key.

* * * * *

UNITED STATES PATENT AND TRADEMARK OFFICE
CERTIFICATE OF CORRECTION

PATENT NO. : 6,549,626 B1
DATED : April 15, 2003
INVENTOR(S) : Al-Salqan

It is certified that error appears in the above-identified patent and that said Letters Patent is hereby corrected as shown below:

Column 8,
Line 47, change "and" to -- an --.

Signed and Sealed this

Twenty-ninth Day of June, 2004

JON W. DUDAS
*Acting Director of the United States Patent and Trademark Office*